United States Patent
Moretti et al.

(10) Patent No.: US 6,860,453 B2
(45) Date of Patent: Mar. 1, 2005

(54) METHOD AND APPARATUS FOR DETECTING AND SIGNALLING DERAILMENT CONDITIONS IN A RAILWAY VEHICLE

(75) Inventors: Roberto Moretti, Turin (IT); Silvano Sema, Turin (IT)

(73) Assignee: SKF Industrie S.p.A., Turin (IT)

( * ) Notice: Subject to any disclaimer, the term of this patent is extended or adjusted under 35 U.S.C. 154(b) by 35 days.

(21) Appl. No.: 10/297,796
(22) PCT Filed: Jun. 7, 2001
(86) PCT No.: PCT/EP01/06422
§ 371 (c)(1), (2), (4) Date: May 6, 2003
(87) PCT Pub. No.: WO01/94176
PCT Pub. Date: Dec. 13, 2001

(65) Prior Publication Data
US 2003/0178532 A1 Sep. 25, 2003

(30) Foreign Application Priority Data
Jun. 9, 2000 (IT) .................................... TO2000A0551

(51) Int. Cl.⁷ .................................................. B60L 1/00
(52) U.S. Cl. .................................... 246/169 R; 701/19
(58) Field of Search .............................. 246/167 R, 170, 246/171, 172; 701/19, 29, 70; 240/566

(56) References Cited

U.S. PATENT DOCUMENTS

| 4,180,811 A | 12/1979 | Yoshimura et al. | |
| 4,344,138 A * | 8/1982 | Frasier | 701/70 |
| 6,411,870 B1 * | 6/2002 | Sato | 701/19 |

FOREIGN PATENT DOCUMENTS

| WO | WO 00/09379 | 2/2000 |

* cited by examiner

Primary Examiner—Mark T. Le
(74) Attorney, Agent, or Firm—Merchant & Gould P.C.

(57) ABSTRACT

A wheel (1) of a railway vehicle is associated with a vibration sensor (3) for supplying a vibration impulsive signal (V), indicative of the vibration of the wheel, to an electronic processing unit (E). This generates, based on the vibration signal (V), an impulsive surveillance signal (S) the instant value of which is increased in a manner correlated to the amplitude of each vibration impulse (I) and decreased in accordance with a predetermined law after each vibration impulse. The processing unit (E) compares the instant value of the surveillance signal (S) with a reference threshold value (T) and automatically generates an alarm signal (A) when the instant value of the surveillance signal (S) reaches or exceeds the reference threshold value (T).

10 Claims, 1 Drawing Sheet

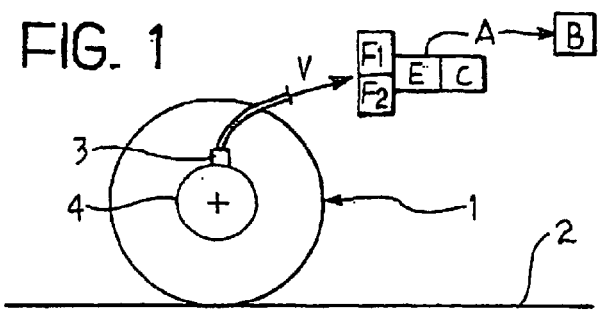
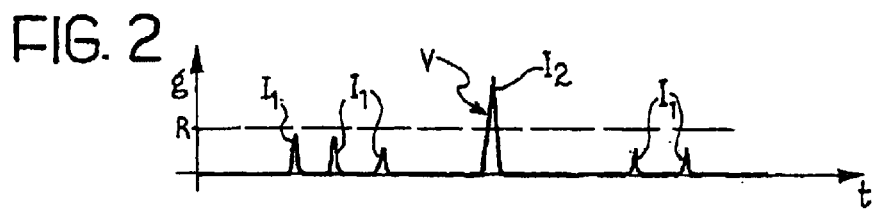
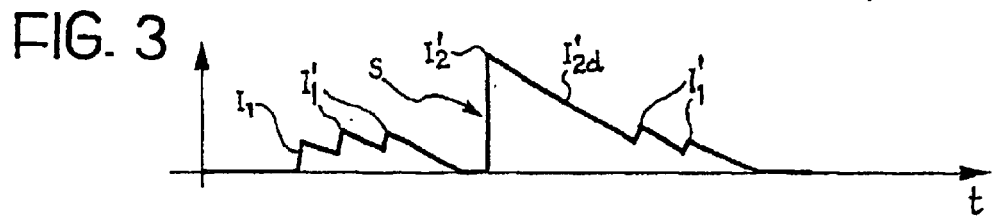
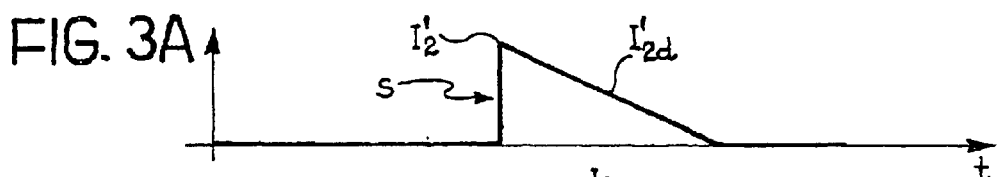
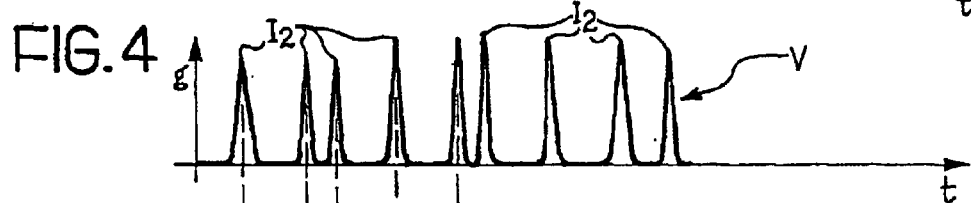
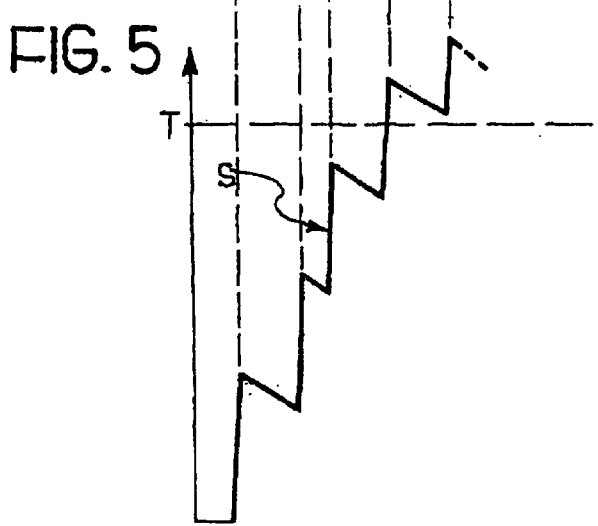

METHOD AND APPARATUS FOR DETECTING AND SIGNALLING DERAILMENT CONDITIONS IN A RAILWAY VEHICLE

The present invention refers to a method and an apparatus for detecting and signalling derailment conditions in a railway vehicle.

In many railroad accidents caused by derailment there occurs at first a partial derailment of an axle or a bogie, sometimes of a single wheel of a railway vehicle. In these cases, usually an axle is displaced in such manner that one of its wheels repeatedly hits the sleepers or the bolts fastening the rail to the sleepers, or the ballast. In other, less frequent cases, it is possible that both wheels of a same axle are lifted up or displaced such that they are not subjected to impacts. In both cases it has been observed that the train may travel in such partial or incipient derailment conditions for many kilometers before a more severe damage or an incident occurs. During this period, neither the motorman nor other personnel on board of the train notice or are warned of the failure and are therefore not aware of the impending danger.

WO-A-00/09379 discloses a method and apparatus for detecting and signalling a derailment condition of a railway vehicle wheel, comprising the steps of:
- providing vibration sensor means associated with at least a wheel of a railway vehicle for generating a vibration impulsive signal indicative of the vibration of the wheel;
- receiving the vibration signal by means of an electronic processing unit;
- generating, based on the vibration signal, an impulsive surveillance signal;
- comparing the instant value of the surveillance signal with a reference threshold value; and
- automatically generating an alarm signal when the instant value of the surveillance signal reaches or exceeds said reference threshold value.

It is an object of the present invention to detect in time a derailment condition of at least one of the wheels of a railway vehicle and generate, in such an event, an alarm signal in real time, so as to be able to stop the train immediately to avoid more serious damage and intervene in good time on the damage that has occurred.

The features and advantages of the invention will be apparent from the ensuing detailed description of a few embodiments thereof, given by way of not-limiting example, reference being made to the attached drawings, in which:

FIG. 1 is a schematic view of a railway vehicle wheel to which there is associated an apparatus according to the invention;

FIG. 2 is a diagram showing in the time domain a vibration signal detected in normal travelling conditions of a railway vehicle;

FIG. 3 is a diagram showing in the time domain a surveillance signal obtained by processing the signal of FIG. 2;

FIG. 3A is a diagram showing in the time domain a surveillance signal obtained by processing the signal of FIG. 2 in accordance with an alternative embodiment of the invention;

FIG. 4 is a diagram showing in the time domain a vibration signal detected in derailment conditions of a wheel or an axle of a railway vehicle; and FIG. 5 is a diagram showing in the time domain a surveillance signal obtained by processing the signal of FIG. 4.

Referring initially to FIG. 1, numeral 1 schematically designates the wheel of a railway vehicle travelling on a railtrack 2. A vibration sensor 3 is mounted on a stationary support element 4, secured to or integral with an element supporting the wheel axle.

The elements shown in FIG. 1 are generally known to those skilled in the art and will not therefore be described in further detail in the ensuing description. For example, the stationary support element 4 may be the axle box housing or an outer cover of the axle box, or the outer stationary race of the axle bearing, or a sealing shield mounted on the outer race.

Preferably, the vibration sensor 3 includes a piezoelectric accelerometer of known kind associated with an amplifier incorporated in the same body which also contains the accelerometer.

For an advantageous application of the invention it is important that all the axles of the train, and preferably all the wheels of the train, are provided with a vibration sensor 3.

Each vibration sensor is connected to an electronic processing unit, schematically designated E, mounted on board of the train. The unit E receives the vibration signal V generated by the vibration sensor 3 and processed this signal as described herein after for recognising and signalling a condition of derailment.

The processing unit E is provided with or connected to circuit means schematically designated C. The circuit means C process the vibration signal and generate a surveillance signal the instant value of which is compared with a reference threshold value indicative of a derailment condition, as explained herein after.

In normal operation conditions, i.e. in the absence of derailment as shown in FIG. 2, where the ordinate axis reports the vertical accelerations undergone by the wheel in a certain period of time, the processing unit receives an impulsive vibration signal V in which appear a series of impulses $I_1$ of small amplitude caused for example by the passage of the train over points, and an isolated impulse $I_2$ of great amplitude, provoked for example by the passage of the wheel over a rigid relief on the rail.

The vibration signal V received by the processing unit is processed by the circuit means C associated with the processing unit E, resulting in the surveillance signal S shown in FIG. 3.

By means of the circuit means C, the instant value of the surveillance signal S is increased in a manner proportional to or anyway correlated with the amplitude of each vibration impulse and decreased according to a predetermined time law after each vibration impulse. FIGS. 3 and 5 show the surveillance signal generated by analog circuit means C which prolong or slow down in time the trailing edge of the impulses of the vibration signal according to a predetermined law. As shown in FIG. 3, in the surveillance signal S the trailing edge $I_1'd$, $I_2'd$ of the impulses $I_1'$, $I_2'$ corresponding to the impulses $I_1$ and $I_2$ of the vibration signal V of FIG. 2.

Circuit means C of the above mentioned kind are known in the art and do not need to be described in detail herein. Suffice it to say here that the circuit means C may indifferently be of the hardware or software kind or a combination thereof. For example they may comprise a capacitive circuit capable of producing the above cited slowing-down effect. Alternatively, the circuit means C may be digital and comprise a counter adapted for counting up or down in accordance with functions equivalent to those described in the following.

In the absence of high impulses of the kind of $I_2$ repeated closely in time, the processing unit effects no additional processing. The impulses $I_1'$ and $I_2'$ of the surveillance signal S fade out and no alarm signal is generated, as the processing unit recognises that an isolated impulse, however high, is not indicative of a derailment condition but simply of an isolated phenomenon not due to defective operation of the wheels but to a foreign cause, for example due to a discontinuity or relief on the rail.

In a particular embodiment of the invention, the processing unit E may be provided with filtering means F1 for preventing the surveillance signal S from being affected by small vibration impulses $I_1$ having an amplitude lower than a reference threshold value R and which are not indicative of a derailment condition. The filtering means F1 may indifferently be of hardware or software kind, i.e. in the form of a device or a program associated with or incorporated within the processing unit E for separating data which are irrelevant for the analysis from the signal coming from the vibration sensor. According to such embodiment, the surveillance signal S takes the form shown in FIG. 3A, i.e. free of small amplitude impulses.

In derailment conditions, at least one of the wheels is out of the rail a repeatedly hits the ballast or the sleepers or the bolts fastening the rail to the sleepers. In such an event, the vibration signal V generated by the accelerometer 3 is of the kind shown in FIG. 4, having a close and repeated succession of high amplitude impulses $I_2$ for a prolonged period of time. A typical acceleration value that can be detected in derailment conditions is to the order of several tenths or a few hundreds of g (gravity acceleration).

Upon receiving a vibration signal V of the kind shown in FIG. 4, the circuit mean C correlate the high intensity impulses and provide a surveillance signal S of the kind shown in FIG. 5, the instant value of which is increased in stepwise manner.

When the value of the signal S reaches or exceeds a reference threshold value T, the processing unit E automatically generates an alarm signal A which warns the personnel on board of the train that a derailment is occurring.

As an alternative or in addition to the above discussed filtering means F1 for filtering small amplitude impulses, the processing unit E may be coupled with filtering means F2 which filter the vibration signal V in such manner as to prevent the surveillance signal S from being affected by vibration frequencies out of a range which is meaningful for the analysis. The meaningful frequencies, generated by the impacts of a derailed wheel, are comprised between zero and a few hundred Hertz. In order to cut out vibration components due to other causes, for example resonance frequencies provoked by the suspension springs, the filtering means F2 cut out of the surveillance signal S those vibrations having frequencies exceeding some hundreds of hertz, for example exceeding 500 Hz.

In case the filtering means F2 are of the software type, the can be self-programmable for instantaneously and automatically varying the limits of the range of frequencies to be cut out as a function of the travelling speed of the train. To this end, the processing unit E is set to receive a signal V indicative of the instant speed of the train provided for example by one or more speed sensors mounted at the wheels. Based on the instant value of the speed signal V, the unit E calculates the limits of the frequencies to be cut out, by varying at least the upper limit in a manner proportional to or anyway increasing with the speed.

In a particular embodiment of the invention, the alarm signal can be supplied to a further control unit (schematically designated B in FIG. 1) to provoke automatic activation of the brakes and stop the train immediately.

In accordance with a particularly preferred embodiment of the invention, the control unit B which provokes automatically the activation of the brakes is set to activate the brakes in different modes, i.e. more or less sharply, as a function of the number of wheels for which an alarm signal has been generated. The braking may be effected sharply if the alarm signal concerns a single wheel or axle, whereas the train may be slowed down more gradually if the alarm signal relates to all the wheels of a bogie or a carriage, to avoid the risk that a sharp braking breaks the train in two, especially where the train has a rear locomotive.

What is claimed is:

1. A method of detecting and signalling a derailment condition of a railway vehicle wheel, comprising the steps of:

providing vibration sensor means (3) associated with at least a wheel (1) of a railway vehicle for generating a vibration impulsive signal (V) indicative of the vibration of the wheel;

receiving the vibration signal (V) by means of an electronic processing unit (E);

generating, based on the vibration signal (V), an impulsive surveillance signal (S);

comparing the instant value of the surveillance signal (S) with a reference threshold value (T); and automatically generating an alarm signal (A) when the instant value of the surveillance signal (S) reaches or exceeds said reference threshold value (T);

characterised in that the instant value of the impulsive surveillance signal (S) is increased in a manner correlated to the amplitude of each vibration impulse (I) and decreased in accordance with a predetermined law after each vibration impulse.

2. The method of claim 1, further comprising the step of:

filtering the vibration signal (V) to render the surveillance signal (S) independent of vibration impulses ($I_1$) having amplitudes lower than a further reference threshold value (R).

3. The method of claim 1, further comprising the step of:

filtering the vibration signal (V) to render the surveillance signal (S) independent of vibrations having frequencies not comprised within a given range.

4. The method of claim 3, further comprising the steps of:

receiving a signal (V) indicative of the instant speed of the train;

calculating, based on the speed signal (V), at least an instant value defining a range of frequencies to be cut out.

5. The method of claim 1, further comprising the step of:

supplying the alarm signal (A) to a control unit (B) for automatically activating the brakes of the train.

6. The method of claim 5, comprising the step of:

automatically controlling the activation of the brakes of the train as a function of the number of derailed wheels.

7. An apparatus for detecting and signalling a derailment condition of a railway vehicle wheel, the apparatus comprising:

vibration sensor means (3), associated with at least a wheel (1) of a railway vehicle, for generating a vibration impulsive signal (V) indicative of the vibration of the wheel; and processing means for:
receiving the vibration signal (V);
generating, based on the vibration signal (V), an impulsive surveillance signal (S);

comparing the instant value of the surveillance signal (S) with a reference threshold value (T); and automatically generating an alarm signal (A) when the instant value of the surveillance signal (S) reaches or exceeds said reference threshold value (T);

characterised in that said processing means comprise means for increasing the instant value of the surveillance signal (S) in a manner correlated to the amplitude of each vibration impulse (I) and decreasing said instant value in accordance with a predetermined law after each vibration impulse.

8. The apparatus of claim 7, further comprising:

filtering means (F1) for filtering the vibration signal (V) so as to render the surveillance signal (S) independent of vibration impulses ($I_1$) having amplitudes lower than a further reference threshold value (R).

9. The apparatus of claim 7, further comprising:

filtering means (F2) for filtering the vibration signal (V) so as to render the surveillance signal (S) independent of vibrations having frequencies not comprised within a given range.

10. The apparatus of claim 9, wherein said processing means are adapted for:

receiving a signal (V) indicative of the instant speed of the train; and calculating, based on the speed signal (V), at least an instant value defining a range of frequencies to be cut out.

* * * * *